Sept. 1, 1959          M. A. MEYER          2,902,218

MULTIPLIER EMPLOYING AMPLITUDE MODULATION

Filed Jan. 26, 1955          2 Sheets-Sheet 1

INVENTOR
MAURICE A. MEYER

BY *Joseph Weingarten*
ATTORNEY

Sept. 1, 1959　　　　　M. A. MEYER　　　　　2,902,218
MULTIPLIER EMPLOYING AMPLITUDE MODULATION
Filed Jan. 26, 1955　　　　　　　　　　　　2 Sheets-Sheet 2
FIG. 6
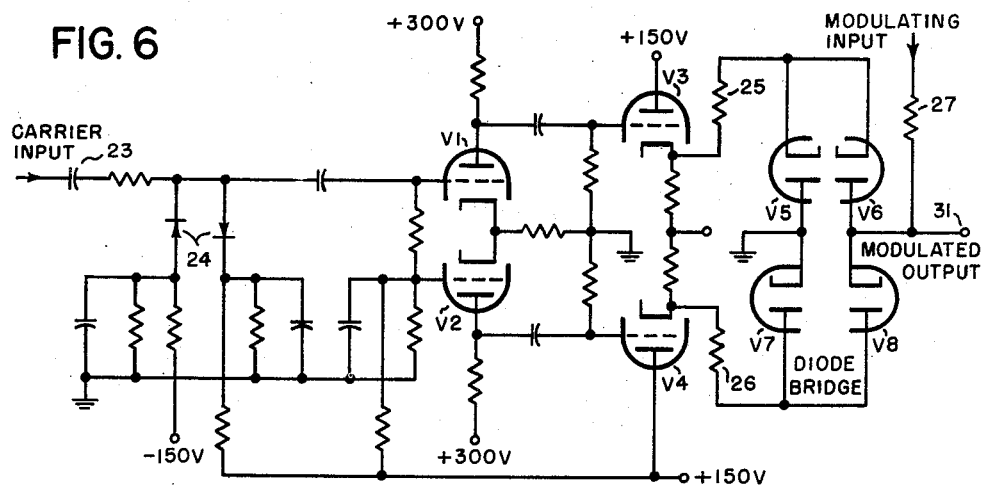
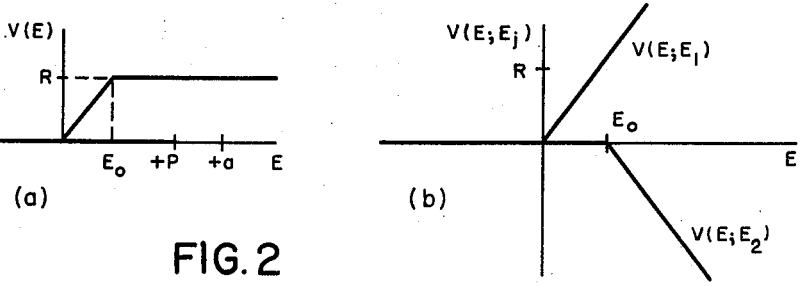
FIG. 2
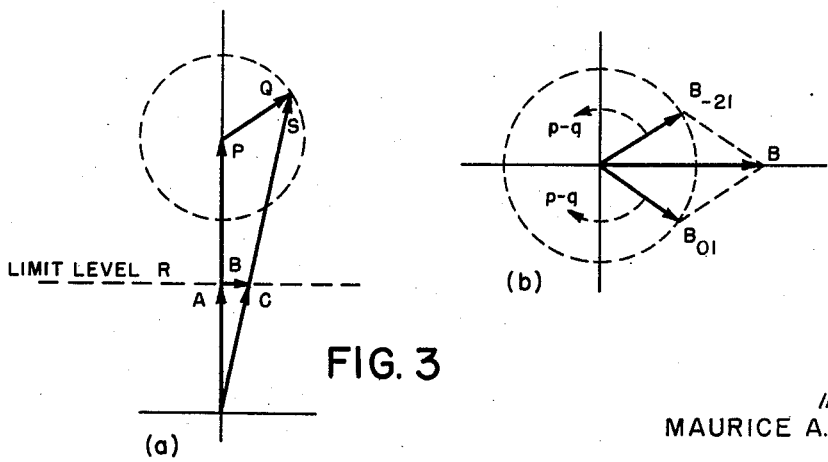
FIG. 3
*INVENTOR*
MAURICE A. MEYER
BY Joseph Weingarten
*ATTORNEY*

United States Patent Office 2,902,218
Patented Sept. 1, 1959

2,902,218

MULTIPLIER EMPLOYING AMPLITUDE MODULATION

Maurice A. Meyer, Natick, Mass., assignor to Laboratory for Electronics, Inc., Boston, Mass., a corporation of Delaware Application January 26, 1955, Serial No. 484,231

19 Claims. (Cl. 235—194)

The present invention relates in general to multipliers and in particular to a novel double amplitude modulation four-quadrant analog multiplier providing a combination of extreme accuracy, high D.-C. stability, wide frequency response with a relatively small number of standard components.

Fundamentally, a four-quadrant analog multiplier is a device which produces an output signal whose magnitude is proportional to the magnitude of the product of the instantaneous magnitudes of two input signals and whose polarity is positive when both input signals are of like polarity; negative, when the inputs are of opposite polarity.

While there are many ways of multiplying electronically, one common technique utilizes a device whose output is proportional to the square of the input signal. If it is desired to multiply one signal, A, by another signal, B, the two are added and applied to a first square-law device which yields an output proportional to $(A+B)^2$ or $A^2+2AB+B^2$. Now if the signals A and B are separately applied to separate square-law devices identical to the first square-law device and the outputs of these separate devices subtracted from the output of the first device, the remainder is proportional to $$A^2+2AB+B^2-A^2-B^2$$

or simply to $2AB$. If the square law device is not perfect and has terms other than of second order in the output, an error in the product results. Other errors occur when the gains of the three square-law devices differ and when the subtracting circuit drifts. Other multipliers formulated on different logical designs have also been lacking in accuracy, D.-C. stability, or frequency response. Furthermore, their composition often included specialized costly components.

The present invention contemplates and has as a primary object the provision of an accurate multiplier operative over a wide frequency range with a high degree of D.-C. stability while minimizing the number of components used.

Basically, the present invention utilizes a novel double amplitude modulation system for deriving the product of two input signals. An internal signal of one frequency is modulated by one of the input signals. A portion of the modulated internal fixed frequency signals is added to another internal signal having a different fixed frequency and this sum is then modulated by the other input signal. The modulated sum is then used to modulate the first fixed frequency signal, yielding an output proportional to the product of the two input signals plus some high frequency terms which are filtered out.

A transformerless balanced modulator relatively insensitive to frequency and exhibiting low amplitude-dependent phase shift helps achieve the above objects. By virtue of the low carrier leakage of the balanced modulator, signals of relatively low amplitudes may be multiplied together. In this manner the invention herein described offers an analog multiplier operative over an extensive dynamic range of signal amplitudes.

Another object of the present invention is to provide a multiplier which provides accurate products for input signal frequencies extending over a broad spectrum including zero frequency.

Still another object is to achieve the above results with apparatus comprising standard commercially-available components. These and other objects and advantages will become apparent from the following specification with reference to the accompanying drawing in which:

Fig. 2a is the dynamic characteristic of the half-wave limiter;

Fig. 2b is a breakdown of the half-wave limiter characteristic into ramp functions to the same scale as that of Fig. 2a;

Fig. 3a and Fig. 3b are vector diagrams helpful in understanding the operation of the novel analog multiplier;

Fig. 6 is a schematic circuit diagram of a preferred embodiment of balanced modulators utilized in the apparatus shown in Fig. 1.

The essence of the invention for multiplying together two input signals is a balanced modulator wherein the carrier input signal includes a signal related to one input signal combined with a fixed frequency signal, and the modulating input thereto is a signal related to the other input signal. Included in the output is a signal proportional to the product of the two signals.

This balanced modulator then provides as an output the signal related to the other input signal at intervals determined by the combination of the fixed frequency signal and the signal related to the one input signal.

Figure 1:
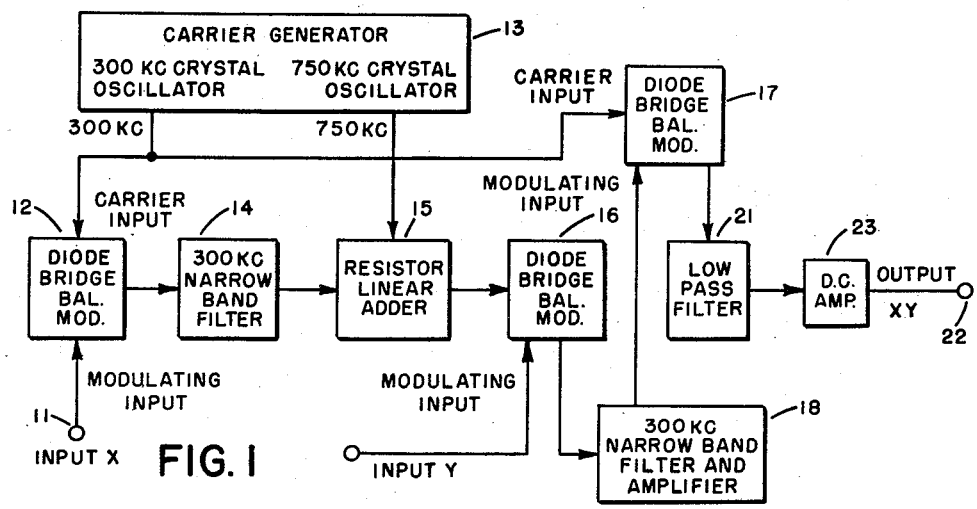
Fig. 1 is a block diagram of a preferred embodiment of the invention.

Referring now to Fig. 1, there is shown in block diagram form, apparatus for performing this multiplication function. Although the internal signals of fixed frequency found in this system may extend over broad ranges without departing from the broad inventive concepts disclosed herein, these frequencies have been chosen in the particular embodiment described to be 750 kc. and 300 kc., in a ratio of 5/2. This particular ratio provides additional advantages which will become apparent from the following discussion. With respect to the two input signals whose product is to be formed, designated as input X and input Y, however, no fixed value will be assigned since these need neither be periodic nor of any specific wave-form, except that the highest frequency components contained in their respective spectra must be less than 300 kc.

As illustrated, input X is applied at terminal 11 to a balanced modulator 12 wherein it is mixed with the 300 kc. carrier furnished by a crystal oscillator, or other suitable stable source within carrier generator 13.

As is well known, a balanced modulator suppresses the input carrier and the harmonics thereof so that its output comprises simply the side bands resulting from the modulation process. Of course, if the modulating input signal is a D.-C. voltage, the frequency of the side bands will be zero cycles from that of the carrier and the output will contain the carrier frequency. Since only the sideband frequencies, about 300 kc. are desired, band-pass filter 14 is designed to be just wide enough to pass the sideband frequencies resulting from the modulation of the carrier by the highest frequency component of input signal X. The signal output of band-pass filter 14 is now combined in a linear resistor adder 15 with the 750 kc. signal, which is the second of the stable signals furnished by carrier generator 13. Thus the output of the linear adder 15 consists essentially of the instantaneous sum of the spectrum of frequencies applied through filter 14 and the sinusoidal 750 kc. wave. The linear resistor adder is so designed that at its output the amplitude of the 750 kc. signal component is considerably greater than the sideband signals applied through filter 14. This sum of the 750 kc. and sideband signals is impressed upon a second modulator 16, functioning as a high frequency carrier.

The modulating input for balanced modulator 16 is simply input Y. The modulation products generated in balanced modulator 16 are applied to a band-pass filter 18. For purposes which will become apparent later this network has its pass characteristics centered at 300 kc., thus rejecting effectively any of the modulation products formed with the 750 kc. component of the input together with any 750 kc. carrier leakage. The band-width of filter amplifier 18 may be the same as that already noted for filter 14. However, the limitations that this imposes on the system will be discussed below. At this point the filter output of filter amplifier 18 is combined with a component of the 300 kc. signal initially applied to balanced modulator 12 in a third balanced modulator 17, the latter circuit functioning in this instance as a phase sensitive detector. The final output signal of the system is derived by applying the output of balanced modulator 17 to low-pass filter 21, the pass-band being approximately one-half that specified for filters 14 and 18, and capable of passing D.-C. The output of low-pass filter 21, namely, the instantaneous product of X and Y is applied to a D.-C. amplifier 23 to achieve the desired high level signal output for the system.

Balanced modulator 16 functions as a half-wave limiter. A half-wave limiter has the characteristic shown in Fig. 2a; that is, for all input signals, E, greater than zero but less than a predetermined value, $E_0$, the output, $V(E)$, is a linear function of the input voltage, E. For values of E greater than $E_0$, the output $V(E)$ is the limiting value, R. For values of E less than zero the output $V(E)$ is substantially zero. In the balanced modulator 16 whenever the 750 kc. carrier, whose amplitude is much larger than that of the sideband signals applied through filter 14, is positive, the diode bridge, which is shown in the balanced modulator schematic of Fig. 6 discussed below, conducts, and there is substantially no voltage at the output of the bridge. However, when the 750 kc. carrier is negative the diode bridge is switched off and the modulating signal, Y, is at that time the output of the balanced modulator 16. Hence the instantaneous value of Y is analogous to the limit level R in Fig. 2a. This output can be derived by applying the work of Sternberg and Kaufman, "A General Solution of the Two-frequency Modulation Product Problem. I," Journal of Mathematics and Physics, vol. 32 (1953), pp. 228–243.

Sternberg and Kaufman consider the general problem of obtaining the output of a modulator with a dynamic characteristic $V(E)$, continuous over the entire range of the input, $-a \leq E \leq a$, and with a two-frequency input of form $$e(t) = P\cos(pt+\theta_p) + Q\cos(qt+\theta_q)$$

where $0 < P \leq (P+Q) \leq 2P \leq a$.

They begin with the double Fourier series expression for the output, $$V(t) = \tfrac{1}{2}C_{00} + \sum_{m,n=0}^{\infty *} C_{\pm mn} \cos(\omega_{\pm mn}t + \phi_{\pm mn})$$

where $\omega_{\pm mn} = mp \pm nq$, $\phi_{\pm mn} = m\theta_p \pm n\theta_q$, and where the asterisk indicates summation over the upper and lower signs for $m \cdot n \neq 0$, over the upper sign only for $m \cdot n = 0$, and excluding the term for which $m=n=0$. They obtain expressions for the modulation product amplitudes as linear combinations of four new functions introduced and tabulated by Sternberg in "A General Solution of the Two-frequency Modulation Product Problem II. Tables of the Functions $A_{mn}(h,k)$," Journal of Mathematics and Physics, vol. 33 (1954).

Sternberg and Kaufman consider the general case of a continuous and smoothly varying dynamic characteristic, $V(E)$, and show that the solution can be approximated arbitrarily closely by replacing $V(E)$ with an approximating function consisting of a sufficiently large number of straight line segments. The solution is exact, however, if $V(E)$ is already a function composed of straight line segments, as in the present case of an ideal half-wave limiter. The dynamic characteristic of the half-wave limiter is drawn in Fig. 2a; and the decomposition of the dynamic characteristic into ramp functions in accordance with the method of Sternberg and Kaufman is shown in Fig. 2b. In terms of N ramp functions, the dynamic characteristic is $$V(E) = \sum_{j=1}^{N} g_j V(E, E_j)$$

where $V(E;E_j) = 0$, $E < E_j$; $V(E;E_j) = E - E_j$, $E \geq E_j$.

For the ideal half-wave limiter $N=2$, and from Fig. 2, $E_1=0$, $E_2=E_0$, $g_1=R/E_0 \equiv g$, and $g_2 = -R/E_0 \equiv -g$. Sternberg and Kaufman find first the coefficients, $A_{\pm mn}(h_j,k)$, of $\cos(\omega_{\pm mn}t + \phi_{\pm mn})$ associated with each individual ramp function where $h_j \equiv E_j/P$, $k \equiv Q/P$. They then find composite coefficients by summation:

$$\tfrac{1}{2}B_{00} = V(-a) + \tfrac{1}{2}P\sum_{j=1}^{2} g_j A_{00}(h_j, k)$$

$$B_{\pm mn} = P\sum_{j=1}^{2} g_j A_{\pm mn}(h_j, k)$$

Since in the case of the half-wave limiter $V(E)$ is exactly described in the interval $-a \leq E \leq a$, then $B_{\pm mn} = C_{\pm mn}$, and the output is $$v(t) = \tfrac{1}{2}B_{00} + \sum_{m,n=0}^{\infty *} B_{\pm mn} \cos(\omega_{\pm mn}t + \phi_{\pm mn})$$

In the present case, $h_1=0$ and $h_2=E_0/P=R/Pg \equiv h$. Sternberg and Kaufman give the double series forms of $A_{+mn}(h,k)$ for $m,n=0,1$. Higher order coefficients are given by recurrence relationships in terms of these four functions. Using these double series forms, e.g., to compute $\tfrac{1}{2}B_{00}$, $$\tfrac{\pi}{2}A_{00}(h,k) + \tfrac{\pi}{2}h = 1\binom{0}{0} + \tfrac{1}{2 \cdot 1}\binom{2}{0}h^2 + \tfrac{1}{2 \cdot 4 \cdot 3}\binom{4}{0}h^4 + \cdots$$
$$+ \tfrac{1}{2 \cdot 1}\binom{2}{2}\tfrac{1}{2}k^2 + \tfrac{1}{2 \cdot 4 \cdot 3}\binom{4}{2}\tfrac{1}{2}h^2k^2 + \cdots$$
$$+ \tfrac{1}{2 \cdot 4 \cdot 3}\binom{4}{4}\tfrac{1}{2}\tfrac{3}{2 \cdot 4}k^4 + \cdots$$

thus $$\tfrac{1}{2}B_{00} = V(-a) + \tfrac{1}{2}P\sum_{j=1}^{2} g_j A_{00}(h_j, k)$$
$$= \tfrac{Pgh}{2} - \tfrac{Pgh}{\pi}\tfrac{1}{2 \cdot 1}\binom{2}{0}h^2 + \tfrac{1}{2 \cdot 4 \cdot 3}\binom{4}{0}h^4 + \cdots$$
$$+ \tfrac{1}{2 \cdot 4 \cdot 3}\binom{4}{2}\tfrac{1}{2}h^2k^2 + \cdots$$

Neglecting some higher order terms, therefore, $$\tfrac{1}{2}B_{00} = \tfrac{1}{2}Pgh(1 - h/\pi + \ldots) = \tfrac{1}{2}R(1 - h/\pi + \ldots)$$

The table below lists the coefficients for the output components of the half-wave limiter with a two-frequency input, computed as above. In each coefficient, the leading term plus the terms of next highest order have been saved.

*Table 1.—Modulation products at output of half-wave limiter with two-frequency input.*

| Modulation Product, $B_{\pm mn} \cos \omega_{\pm mn} t$ | Amplitude, $B_{\pm mn}$ | Frequency in kc., ($\frac{1}{2}\pi$) ($mp \pm nq$) |
|---|---|---|
| $\frac{1}{2}B_{00}$ | $\frac{R}{2}\left(1-\frac{h}{\pi}+\ldots\right)$ | 0 |
| $B_{10} \cos pt$ | $\frac{2R}{\pi}\left(1-\frac{h^2}{6}-\frac{k^2}{4}\ldots\right)$ | 750 |
| $B_{01} \cos qt$ | $\frac{Rk}{\pi}\left(1+\frac{h^2}{6}+\frac{k^2}{8}+\ldots\right)$ | 300 |
| $B_{20} \cos 2pt$ | $\frac{Rh}{\pi}\left(1-\frac{h^2}{4}+\frac{3}{4}k^2+\ldots\right)$ | 1,500 |
| $B_{\pm 11} \cos (p \pm q)t$ | $\frac{Rkh}{2\pi}\left(1+\frac{h^2}{4}+\frac{3}{4}k^2+\ldots\right)$ | $\begin{bmatrix}1,050\\450\end{bmatrix}$ |
| $B_{02} \cos 2qt$ | $\frac{Rk^2h}{8\pi}\left(-1-\frac{3}{4}h^2-\frac{3}{4}k^2-\ldots\right)$ | 600 |
| $B_{30} \cos 3pt$ | $\frac{2R}{3\pi}\left(-1+\frac{3}{2}h^2+\frac{9}{4}k^2+\ldots\right)$ | 2,250 |
| $B_{\pm 21} \cos (2p \pm q)t$ | $\frac{Rk}{\pi}\left(-1+\frac{h^2}{2}+\frac{3}{8}k^2+\ldots\right)$ | $\begin{bmatrix}1,800\\1,200\end{bmatrix}$ |
| $B_{\pm 12} \cos (p \pm 2q)t$ | $\frac{Rk^2}{4\pi}\left(-1-\frac{h^2}{2}-\frac{k^2}{4}\ldots\right)$ | $\begin{bmatrix}1,350\\150\end{bmatrix}$ |
| $B_{03} \cos 3qt$ | $\frac{Rk^3}{24\pi}\left(1+\frac{3}{2}h^2+\frac{9}{16}k^2+\ldots\right)$ | 900 |

Two frequency input $= P \cos pt + Q \cos qt$.
$k = Q/P$.
$h = $ (Limit level referred to input)$/P = E_0/P$.
$R = $ (Limit level referred to output).
$(h+k) < 1$.

It is seen from the table of coefficients that three modulation products have amplitudes that make the products useful for analog multiplication. One is $B_{01} \cos qt$, and the other two are $B_{\pm 21} \cos(2p \pm q)t$; the former modulation product is at 300 kc., and the latter two are at 1200 kc. and 1800 kc., by the previously stated choices of $p$ and $q$. The leading term in all is of form $Rk$, where $k\alpha X$ by the action of the first balanced modulator 12 and linear adder 15, and $R\alpha Y$ by the action of the second balanced modulator 16. The 300 kc. modulation product was chosen for demodulation because it is of lower frequency than the others, and because the higher order terms of the amplitude coefficient are smaller by a factor of $\frac{1}{3}$ than the equivalent terms in the 1200 kc. and 1800 kc. modulation products. Also, the coherent 300 kc. carrier from the carrier generator 13 is automatically available for use in phase sensitive detection. There are other modulation products that occur at 300 kc., but none have amplitudes as large as the higher order terms shown in $B_{01}$, by the choice of small values of $h$ and $k$. The $B_{-24}$ modulation product, e.g., has a leading term of the form $Rhk^4$.

The higher order terms of the $B_{01}$ coefficient show how small $h$ and $k$ must be for a chosen maximum error contribution from these sources. Specifically, values for $h$ and $k$ of .1 are sufficient for a 1% multiplier. The $B_{\pm mn}$ coefficients also show the relative amplitudes of other modulation products that must be eliminated before demodulation of $B_{01}$ modulation product. They accordingly permit the design of the narrow band filter that is placed between balanced modulator 16 and the phase sensitive detector 17. A stagger-tuned triple was chosen for this filter with a half-power band width of 60 kc. and a 300 kc. center frequency. This filter sufficiently attenuates the most troublesome modulation products represented by coefficients $B_{00}$, $B_{10}$, $B_{-11}$ and $B_{-12}$.

The frequencies of the unwanted modulation products given in Table 1, with respect to the $B_{01} \cos qt$ product, show why a frequency ratio $p/q$ of 5/2 was chosen. This ratio places the unwanted modulation products $B_{-11}$ and $B_{-12}$ symmetrically on either side of 300 kc., each 150 kc. distant. A small deviation from $p/q=5/2$ by changing $p$ would move one of the modulation products, $B_{-11}$ or $B_{-12}$ nearer than 150 kc. from 300 kc. $p/q=3/2$ would be acceptable on the same basis, except that the modulation product at 450 kc. would then be the high amplitude term $B_{10} \cos pt$ and would be more difficult to filter out.

An intuitive and approximate explanation for the occurrence of the $B_{01}$ modulation product depends upon a vector diagram of the operations involved. In Fig. 3, P represents the vector $P \cos pt$ with respect to a frame of reference rotation at angular frequency $p$. Q represents the vector $Q \cos qt$, where $Q<<P$, $q<p$, and $Q\alpha X$. Q is placed at the tip of P to represent the linear addition of the output of the X balanced modulator, $Q \cos qt$, and the fixed amplitude carrier, $P \cos pt$. P is stationary with respect to the reference frame, while Q rotates clockwise at an angular frequency of $p-q$. The resultant of the vector addition, S, is half-wave limited by the Y balanced modulator. This limiting is represented by the limit level R, where $R\alpha Y$. The result of limiting is the vector C, the tip of which travels back and forth along the limit level line. C can be resolved into the stationary component A, and the quadrature component B. The component A corresponds in the table above to the modulation product $B_{10}$ with amplitude proportional to R, and of angular frequency $p$. The component B is approximately proportional in amplitude to $RQ/P=Rk$ and can be resolved, as shown, into oppositely rotating components $B_{01}$ and $B_{-21}$, rotating clockwise and counter-clockwise at $p-q$ respectively with respect to the particular form of reference. Each of the vectors $B_{01}$ and $B_{-21}$ are approximately proportional to $RQ/P=Rk$, and rotate at absolute angular frequencies of $q$ and $2p-q$, respectively, so that they correspond to the modulation products $B_{01}$ and $B_{-21}$ in the table above.

Figure 4:
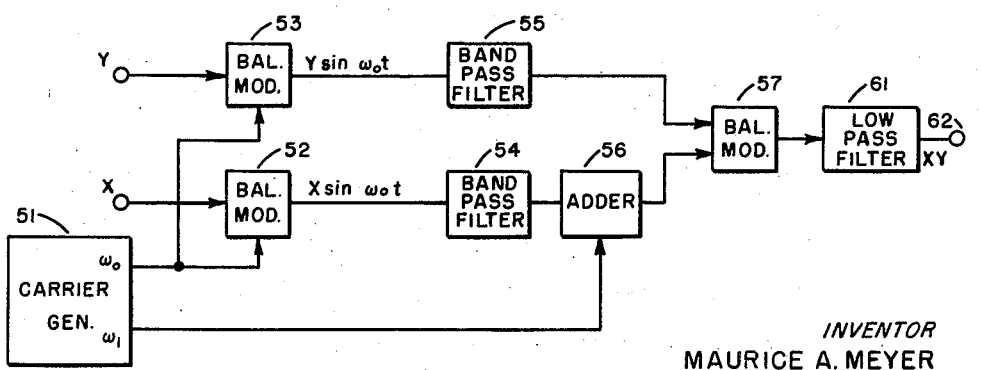

Referring now to Fig. 4 there is shown a block diagram of another embodiment of the invention which provides additional advantages. The carrier generator 51 provides two internal signals of fixed frequencies $\omega_0$ and $\omega_1$. The signal of frequency $\omega_0$ is applied as a carrier input to balanced modulators 52 and 53. To balanced modulator 52, input signal X is applied as a modulating signal and input signal Y is the modulating signal for balanced modulator 53. The output signals from balanced modulators 52 and 53 are applied to identical band-pass filters 54 and 55, each with a center frequency of $\omega_0$. The output of filter 54 is combined with a signal of frequency $\omega_1$ from carrier generator 51 in linear adder 56, the amplitude of the signal of frequency $\omega_1$ being considerably larger than that of the output signal from filter 54. The output of linear adder 56 is then the sum of the carrier signal of frequency $\omega_0$ modulated by the X input signal and the other carrier signal of frequency $\omega_1$. This output signal from linear adder 56 is applied to balanced modulator 57 as a carrier input signal. The output of filter 55, the carrier signal of frequency $\omega_0$ modulated by the Y input signal, is applied as a modulating input to balanced modulator 57. The output of balanced modulator 57 includes a signal proportional to the product of input X and input Y in addition to some high frequency terms which are removed by low-pass filter 61, leaving the desired product signal proportional to XY on terminal 62.

This system further improves on that of Fig. 1 in that prior to multiplication, the X and Y input signals pass through substantially identical channels so that the relative phase between the two signals remains unchanged from the time the signals enter the input terminals of the multiplier until the signal proportional to their product is derived. This system also provides channels of the same bandwidth for both X and Y input signals.

Figure 5:
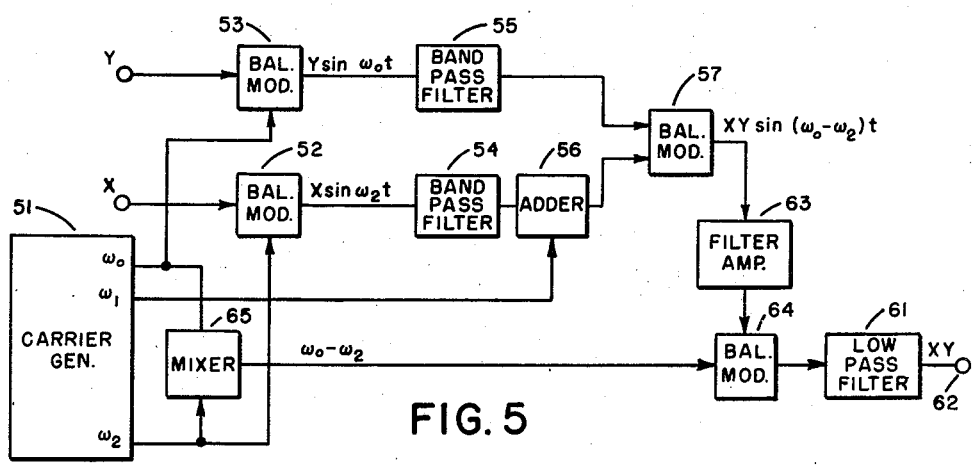
Figs. 4 and 5 are block diagrams of other embodiments of the invention offering additional advantages.

Still another embodiment of the invention is shown in Fig. 5. Where apparatus in a square of Fig. 4 performs the same or closely related function as that in a square of Fig. 6, the reference numerals are carried over.

In this novel embodiment multiplication is facilitated by appropriately combining three internal fixed-frequency signals with the input signals whose product is desired.

Basically, the two input signals separately modulate two of the fixed frequency signals. One of the modulated fixed frequencies is combined in a linear adder with the third fixed frequency to form a sum signal which is applied to a balanced modulator as a carrier input. The other modulated fixed frequency is applied as a modulating input to the balanced modulator. The output of the balanced modulator includes a signal whose frequency is the frequency difference between the first two fixed frequencies and whose amplitude is proportional to the product of the input signals. This product difference frequency signal is selectively applied to a final balanced modulator as a modulating input. The carrier signal input to the final balanced modulator is the difference frequency formed by mixing the first two fixed frequencies prior to their modulation by the input signals. The output of the final balanced modulator includes the desired product signal.

In Fig. 5 a signal of frequency $\omega_0$ from carrier generator 51 is applied as a carrier input to balanced modulator 53 whose modulating input is input signal Y. The carrier input to balanced modulator 52 from carrier generator 51 is a signal of frequency $\omega_2$ and the modulating input thereto is input signal X. The output of balanced modulator 52 is applied to band-pass filter 54 whose center frequency is $\omega_2$. The signal output from band-pass filter 54 is added to a signal from carrier generator 51 of frequency $\omega_1$ in adder 56. The sum thereby derived is applied as a carrier input to balanced modulator 57.

The output of balanced modulator 53 is filtered by band-pass filter 55 whose center frequency is $\omega_0$ and thence applied as the modulating input to balanced modulator 57. The output of balanced modulator 57 is selectively applied as a modulating input to balanced modulator 64 through filter amplifier 63, the center of its pass band being at $(\omega_0-\omega_2)$. The two signals of frequency $\omega_0$ and $\omega_2$ from carrier generator 56 are mixed in mixer 65. The resulting difference frequency signal is applied as a carrier input to balanced modulator 64. The high frequency components of the output signal of balanced modulator 64 are removed by low-pass filter 61 and the signal proportional to the desired product signal XY appears on output terminal 62.

Filters 54 and 55 may be designed to have substantially the same bandwidth and to cause substantially no change in the relative phase between the two input signals during the multiplication process.

Hence, this embodiment provides all the advantages of the apparatus shown in Fig. 1 and Fig. 4 with the additional advantage that the product signal from balanced modulator 57 is at a convenient frequency for amplification. As a result, the product signal at terminal 62 is obtainable at a very high level without the need for an output D.-C. amplifier, thereby providing a still wider dynamic amplitude range with increased D.C. stability.

Referring now to Fig. 6, the schematic diagram of a preferred form of balanced modulators 12, 16, 17, 52, 53, 57 and 64 will be described in detail. The sine wave carrier to be modulated enters the circuit through capacitor 23 with a peak amplitude that is large compared with the bias voltages on the clipping diodes 24. The crystal diodes 24 symmetrically clip the sine wave to produce a square wave that is amplified and made push-pull by the cathode coupled triodes, V1 and V2. The double ended output passes through the pair of cathode followers, V3 and V4, where it becomes the switching function for the shunt-type balanced diode bridge composed of V5, V6, V7, and V8. The series precision resistors, 25 and 26, in the switching voltage inputs balance the currents supplied by the two inputs. The modulating voltage is applied to the bridge through resistor 27, and the output is taken from the bridge side of resistor 27 at terminal 31. The output consists of a square wave of the carrier frequency, swinging between the modulating voltage, and a small voltage that is close to ground and proportional to the modulating voltage.

The bridge diodes V5 through V8, consist of two 6AL5 tubes. Two tubes are easily found that provide good D.C. balance of the bridge. When the two switching function inputs are in fair balance, and the modulating voltage is made zero, carrier leakage that is 50 db below the maximum output of the balanced modulator is easily obtainable. This carrier leakage figure is identifiable with the dynamic range capabilities of the balanced modulator, and the dynamic range could accordingly be extended by devoting more care to balancing the switching function inputs and the diode bridge. Germanium diodes may also be used as the bridge elements.

The balanced modulator, to be usable in the multiplier, must have a fundamental component at the output that is accurately proportional to the modulating voltage. This requirement demands that the sine wave carrier input to the diode bridge be of a peak amplitude that is large compared with the maximum modulating input. If the balanced modulator is considered as a half wave limiter with peak carrier input, E, and modulating input of fixed magnitude, $e$, the peak amplitude of the fundamental component at the output of the balanced modulator is:

$$\text{Fundamental peak output} = \frac{2e}{\pi}\left(1 - \frac{1}{6}\frac{e^2}{E^2} + \cdots\right)$$

A ratio of $e/E$ less than .1, therefore, will make the balanced modulator sufficiently linear for use in a 1 percent multiplier.

The diode bridge is not driven with a sine wave carrier of peak amplitude E directly to avoid the necessity for a higher power carrier circuit. This is the reason for the preliminary limiting by the symmetrical diode clippers at the input to the balanced modulator.

When this balanced modulator functions as a phase-sensitive detector as in block 17 of Fig. 1, the carrier input is the 300 kc. signal from carrier generator 13 and the modulating input is the product signal with sideband frequencies symmetrically spaced about 300 kc. applied through filter-amplifier 18. The output in this case includes difference frequency components of the desired XY product signal. When a zero frequency component is present in the XY product signal, its presence is indicated in the modulating input by a 300 kc. component whose amplitude, and phase with respect to the 300 kc. carrier input, is indicative of the magnitude of this component. Because the bridge produces an output in response to this phase difference, it is said to be a phase-sensitive detector in this application.

Series resistors 25 and 26 and input resistor 27 are made small to permit use of high carrier frequencies. The circuit described avoids transformer coupling to the diode bridge, yielding a balanced modulator that is relatively frequency insensitive and that exhibits low amplitude-dependent phase shift.

Measurements were made to determine the accuracy of the product output of the multiplier with D.C. inputs for X and Y. The absolute error in the product is less than ±0.5% of the full scale output of the multiplier in all four quadrants. This error reduces to ±0.2% of full scale with an output that is one-tenth of full scale. Maximum X and Y inputs are ±20 volts. The full scale output XY is ±20/π volts at the output of the low pass filter 21 following the phase sensitive detector 17. The D.C. amplifier 22 following the low pass filter 21 restores a full scale XY output of ±20 volts.

The narrow band filter 14 is a stagger-tuned double with a band width of 60 kc., and the filter 18 is a stagger-tuned triple with a band width also of 60 kc. The half-power frequency of the XY output with respect to Y, therefore, is 30 kc., while the half-power frequency of the XY output with respect to X is somewhat less. The low pass filter used at the output attenuates ½ db at 30 kc., and attenuates 50 db for frequencies above 200 kc.

D.C. stability at the output of the double amplitude modulation multiplier is obtained by driving the modulation inputs to the balanced modulators from chopper stabilized D.C. amplifiers. A change in the carrier leakage from the balanced modulators is capable of causing D.C. drift at the multiplier output, but this leakage is always small, and the characteristics of the balanced modulators are stable. The modulating input to the phase sensitive detector is presently driven from a biased cathode follower, but this source of D.C. drift could be eliminated. A D.C. drift stability of ±30 millivolts over a period of several hours was attained with the test multiplier, compared with a ±20 volt full scale output.

The scale factor stability of the double amplitude modulation multiplier is made great by the use of negative feedback amplifiers, not shown, at the input and output of the multiplier. Scale factor stability is otherwise dependent upon the constancy of the gain of the cathode followers, and the cathode-degenerated pentode amplifiers in the stagger-tuned triple filter. The scale factor depends directly upon the amplitude of the 750 kc. carrier. This carrier is accordingly stabilized by limiting and filtering in the carrier generator. A change in the phase between the two 300 kc. inputs to the phase sensitive detector is capable of affecting the scale factor of the multiplier, but a phase change of about 6° is necessary to cause a .5% change in the scale factor. The phase stability of the multiplier circuits is much better than 6°. A scale factor stability of ±1% over a period of several hours was attained with the test multiplier with a full scale output.

From experience with the test multiplier described it is predictable that the design factors of power requirements, accuracy, signal bandwidth, and to some extent tube complement can be adjusted to optimize, within limits, the most important performance requirement for a particular application. An accuracy of ±.1%, e.g., might be obtainable at the expense of bandwidth, or a bandwidth of several hundred kilocycles at the expense of accuracy. Higher frequency carriers may be used together with wider band filters permitting increased bandwidth with no sacrifice of accuracy.

From the above description it is seen that accurate wide-band multiplication is available with the invention herein disclosed. By amplitude modulating the sum of a modulated first frequency, desired product signals are readily selected while undesired signals are as readily rejected. This novel method provides these highly desirable results from apparatus comprising conventional economical commercially-available components.

It is evident that innumerable internal frequency combinations may be used without departing from the principles of the invention. By successively utilizing the output of the analog multiplier herein disclosed as one input signal to another multiplier of this type and a third signal as the other input, etc., it is apparent that the product of any number of input signals may readily be derived.

In view of the fact that one skilled in the art may make numerous modifications without departing from the spirit of this invention, it is to be construed as limited only by the spirit and scope of the appended claims.

What is claimed is:

1. A multiplier comprising, a source of first and second fixed frequency signals, means for modulating said first signal with an input signal, means for forming the sum of the modulated first signal and said second signal, modulating means functioning as a half-wave limiter for modulating said sum with another input signal, and means for modulating the first signal with the modulated sum.

2. A multiplier comprising, sources of first and second fixed frequency signals, a first modulator coupled to the source of said first frequency, a first input signal coupled to said first modulator, an adding network whose inputs are said second fixed frequency signal and the output of said first modulator, a second modulator functioning as a half-wave limiter coupled to the output of said adding network, a second input signal coupled to said second modulator, and a third modulator coupled to said second modulator and the source of said first fixed frequency signal.

3. An analog multiplier for multiplying one input signal by another comprising, a source of relatively high and low frequency signals, means for modulating said low frequency signal with the one input signal, a linear adder for providing as an output the sum of said high frequency signal and said modulated low frequency signal, modulating means functioning as a half-wave limiter for modulating said sum with the other input signal, means for modulating said low frequency signal with the modulated sum thereby providing a final output containing a product signal, and a filter energized by said final output for passing only said product signal.

4. An analog multiplier for providing a signal proportional to the product of two input signals comprising, sources of relatively low and high frequency carrier signals, a balanced modulator for modulating said low frequency carrier signal with one of said input signals, a band-pass filter, a linear adder energized by both the modulated low frequency carrier signal applied through said band-pass filter and said high frequency carrier signal and providing as an output the sum thereof, a balanced modulator for modulating said sum with the other input signal, a filter-amplifier for selectively amplifying the modulated sum, a balanced modulator for modulating said low frequency carrier signal by the amplified modulated sum to provide a final output signal, and a low-pass filter energized by said final output signal.

5. An analog multiplier for multiplying one input signal by another comprising, a source of first and second fixed frequency signals, a modulator for modulating said first fixed frequency signal with the one input signal, a linear adder for providing as an output the sum of said second fixed frequency signal and said modulated low frequency signal, a modulator for modulating said sum by the other input signal, a modulator for modulating said first fixed frequency signal by the modulated sum, thereby providing a final output signal containing a product signal, and a filter energized by said final output signal and passing only said product signal.

6. An analog multiplier for providing a signal proportional to the product of first and second input signals comprising, a source of first and second high frequency carrier signals, a balanced modulator for modulating said first carrier signal with said first input signal to yield a first modulated signal, a band-pass filter energized by said first modulated signal, a linear adder for combining the filter first modulated signal with said second carrier signal providing as an output signal the sum thereof, a balanced modulator for modulating said sum with said second input signal, a filter-amplifier for selectively amplifying the modulated sum, a balanced modulator for modulating said first carrier signal by the amplified modulated sum to provide a final output signal, and a low-pass filter energized by said final output signal.

7. Apparatus as in claim 6 wherein the frequency ratio of said first and second carrier signals is substantially 2:5.

8. Apparatus as in claim 6 wherein the amplitude of said filtered first modulated signal is small compared to the amplitude of said second carrier signal.

9. In an analog multiplier for providing an output signal proportional to the product of first and second input signals, apparatus comprising a source of first and second high frequency carrier signals, first and second balanced modulators each having an output and modulating and carrier inputs, the modulating input of said first balanced modulator being energized by said first input signal, the modulating input of said second balanced modulator being energized by said second input signal, both balanced modulator carrier inputs being energized by said first carrier signal, means for combining the output of the one of said balanced modulators with said second carrier signal to provide a sum signal, a final balanced modulator having an output and modulating and carrier inputs, the carrier input of said final balanced modulator being energized by said sum signal, the modulating input thereof energized by the output of said second balanced modulator, and a low-pass filter energized by the output of said final balanced modulator.

10. In an analog multiplier which provides an output signal proportional to the product of first and second input signals, apparatus comprising, a source of a fixed frequency signal, an adder for combining a signal derived from said first input signal with said fixed frequency signal to provide a sum signal, a balanced modulator functioning as a half-wave limiter utilizing said sum signal as a carrier input, and as a modulating input a signal derived from said second input signal.

11. In an analog multiplier for providing an output signal proportional to the product of first and second input signals, apparatus comprising, a source of first and second high frequency carrier signals, first and second balanced modulators each having an output and modulating and carrier inputs, the modulating input of said first balanced modulator energized by said first input signal, the modulating input of said second balanced modulator being energized by said second input signal, both balanced modulator carrier inputs being energized by said first carrier signal, first and second band-pass filters, respectively energized by the outputs of said first and second balanced modulators, means for combining the output of said first band-pass filter with said first carrier signal to provide a sum signal, a final balanced modulator having an output and modulating and carrier inputs, the carrier input thereof being energized by said sum signal, the modulating input thereof being energized by the output of said second balanced modulator, and a low-pass filter energized by the output of the final balanced modulator.

12. In an analog multiplier for providing an output signal proportional to the product of first and second input signals apparatus comprising, a source of first, second and third high frequency carrier signals, first and second balanced modulators each having an output and carrier and modulating inputs, the modulating inputs of said first and second balanced modulators being energized respectively by said first and second input signals, the carrier inputs of said first and second balanced modulators being energized respectively by said first and second carrier signals, first and second band-pass filters respectively energized by the outputs of said first and second balanced modulators, means for combining the output of said second band-pass filter with said third fixed frequency signal to provide a sum signal, a balanced modulator having a modulating input energized by the output of said first band-pass filter and having a carrier input energized by said sum signal to yield a product signal, a filter amplifier energized by said product signal, means for providing a difference frequency signal by mixing said first and second carrier signals, a balanced modulator having a modulating input energized by said product signal and having a carrier input energized by said difference frequency signal to provide a final product signal, and a low-pass filter energized by said final product signal.

13. In an analog multiplier utilizing at least one fixed frequency signal and suitable for providing an output signal proportional to the product of first and second input signals which may be applied to first and second input terminals respectively, apparatus comprising, an adder having at least fixed and signal input terminals and an output terminal, the former terminal suitable for energization by said fixed frequency signal, means for coupling said first input terminal to said signal input terminal, a balanced modulator functioning as a half-wave limiter and having carrier and modulating input terminals, means for coupling said adder output terminal to said carrier input terminal, and means for coupling said second input terminal to said modulating input terminal.

14. In a multiplier for deriving a signal proportional to the product of first and second input signals, a source of a fixed frequency signal, means for additively combining said fixed frequency signal with a signal related to said first input signal to derive a sum signal, and modulating means functioning as a half-wave limiter for modulating said sum signal with a signal related to said second input signal.

15. In a multiplier for deriving a signal proportional to the product of first and second input signals, a source of a fixed frequency signal, means for additively combining said fixed frequency signal with a signal of small amplitude relative to the fixed frequency signal amplitude and related to said first input signal to derive a sum signal, and a balanced modulator functioning as a half-wave limiter with carrier and signal inputs respectively energized by said sum signal and a signal related to said second input signal.

16. In a multiplier for deriving an output signal proportional to the product of first and second input signals, apparatus comprising a source of carrier signals including first and second fixed frequency signals, means for modulating said first fixed frequency signal with said first input signal, means for adding the modulated first fixed frequency signal to said second fixed frequency signal to derive a sum signal, and modulating means functioning as a half-wave limiter for modulating said sum signal with a signal related to said second input signal.

17. In a multiplier for providing an output signal proportional to the product of first and second input signals, apparatus comprising, sources of first and second fixed frequency signals, an input balanced modulator with an output, a modulating input which may be energized by said first input signal and a carrier input coupled to the source of said first fixed frequency signal, a signal input terminal which may be energized by said second input signal, an adder network with an output and at least two inputs respectively coupled to the output of said input balanced modulator and the source of said second fixed frequency signal, and an output balanced modulator functioning as a half-wave limiter with first and second inputs respectively coupled to said signal input terminal and the adder network output.

18. In a multiplier for deriving an output signal proportional to the product of first and second input signals, apparatus comprising a source of carrier signals including first and second fixed frequency signals, means for modulating said first fixed frequency signal with said first input signal, means for applying the modulated first fixed frequency signal to a filter having a pass band about the first fixed frequency, means for adding the output signal from said filter to said second fixed frequency signal to derive a sum signal, and modulating means functioning as a half-wave limiter for modulating said sum signal with a signal related to said second input signal.

19. In a multiplier for providing an output signal proportional to the product of first and second input signals, apparatus comprising, sources of first and second fixed frequency signals, an input balanced modulator with an output, a modulating input which may be energized by said first input signal and a carrier input coupled to the source of said first fixed frequency signal, means for coupling the output of said input balanced modulator to the input of a filter having a pass band about the first fixed frequency, a signal input terminal which may be energized by said second input signal, an adder network with an output and at least two inputs respectively coupled to the output of said filter and the source of said second fixed frequency signal, and an output balanced modulator functioning as a half-wave limiter with first and second inputs respectively coupled to said signal input terminal and the adder network output.

References Cited in the file of this patent

UNITED STATES PATENTS

| | | |
|---|---|---|
| 2,425,405 | Vance | Aug. 12, 1947 |
| 2,497,883 | Harris | Feb. 21, 1950 |
| 2,519,223 | Cheek | Aug. 15, 1950 |
| 2,805,021 | Weibel | Sept. 3, 1957 |

UNITED STATES PATENT OFFICE

CERTIFICATION OF CORRECTION

Patent No. 2,902,218

September 1, 1959

Maurice A. Meyer

It is hereby certified that error appears in the above numbered patent requiring correction and that the said Letters Patent should read as corrected below.

Column 4, line 46, for "$A_{+mn}$" read -- $A_{\overline{+mn}}$ --; column 5, Table 1, under the heading "Amplitude", fifth line, the formula should appear as shown below instead of as in the patent:

$$\frac{Rkh}{2\pi}(1+\frac{h^2}{4}+\frac{3}{8}k^2+\ldots)$$

Signed and sealed this 2nd day of May 1961.

(SEAL)
Attest:

ERNEST W. SWIDER
Attesting Officer

DAVID L. LADD
Commissioner of Patents